(12) United States Patent
Paris

(10) Patent No.: US 6,639,375 B2
(45) Date of Patent: Oct. 28, 2003

(54) CONTROL DEVICE AND METHOD FOR CONTROLLING A CONTROL ELEMENT

(75) Inventor: Brian D. Paris, Warminster, PA (US)

(73) Assignee: Harold Beck and Sons, Inc., Newtown, PA (US)

( * ) Notice: Subject to any disclaimer, the term of this patent is extended or adjusted under 35 U.S.C. 154(b) by 21 days.

(21) Appl. No.: 10/020,716

(22) Filed: Oct. 30, 2001

(65) Prior Publication Data

US 2003/0080707 A1 May 1, 2003

(51) Int. Cl.[7] .............................. G05B 1/06; G05B 13/00
(52) U.S. Cl. ........................ 318/624; 318/611; 318/561; 700/40
(58) Field of Search ................................ 318/560, 624, 318/610, 630, 561, 609, 611, 621; 700/28, 40

(56) References Cited

U.S. PATENT DOCUMENTS

| 3,857,612 | A |   | 12/1974 | Bynum |   |
|---|---|---|---|---|---|
| 3,993,166 | A |   | 11/1976 | Senour |   |
| 4,250,543 | A | * | 2/1981 | Smith et al. | 318/610 |
| 4,344,128 | A | * | 8/1982 | Frye | 318/611 |
| 4,468,599 | A | * | 8/1984 | Berman et al. | 318/434 |
| 4,742,284 | A | * | 5/1988 | Dziubakowski et al. | 318/624 |
| 4,856,465 | A |   | 8/1989 | Denz et al. |   |
| 4,976,338 | A |   | 12/1990 | Holland |   |
| 4,988,935 | A | * | 1/1991 | York | 318/561 |
| 5,008,602 | A | * | 4/1991 | Stevens et al. | 318/610 |
| 5,162,987 | A | * | 11/1992 | Sambhu | 318/606 |
| 5,254,926 | A |   | 10/1993 | Miller et al. |   |
| 5,435,290 | A |   | 7/1995 | Gopp et al. |   |
| 5,559,416 | A |   | 9/1996 | Hrassky |   |
| 5,683,327 | A |   | 11/1997 | Inuzuka et al. |   |
| 5,691,856 | A |   | 11/1997 | Kardash |   |
| 5,966,679 | A | * | 10/1999 | Snowbarger et al. | 702/105 |
| 6,441,578 | B1 | * | 8/2002 | Mir et al. | 318/599 |

* cited by examiner

Primary Examiner—Robert E. Nappi
Assistant Examiner—Eduardo Colon-Santana
(74) Attorney, Agent, or Firm—Akin Gump Strauss Hauer & Feld, L.L.P.

(57) ABSTRACT

A control device and method is provided for controlling a control element by receiving a controller demand signal and a control element sensor signal, and processing the signals to determine if there is a change in the controller demand signal and/or a change in the control element sensor signal. A first dead band range and/or a second dead band range are determined based on the change in the controller demand signal and/or based on the change in the control element sensor signal. An error signal is calculated from the controller demand signal and the control element sensor signal, and a control signal for controlling the control element is generated based on the determination of the dead band ranges and whether the calculated error signal is outside of the first and/or second dead band ranges.

26 Claims, 7 Drawing Sheets

CONTROL DEVICE AND METHOD FOR CONTROLLING A CONTROL ELEMENT

BACKGROUND OF THE INVENTION

Maintaining the accurate output of end products of a process can require the monitoring of output and modification of the process to correct unwanted characteristics in the end product. Systems for monitoring and modifying a process are collectively known as control systems. Control systems require appropriate accuracy and reliability to properly monitor and modify a process.

Control systems typically include controllers, measurement instruments and control elements. The basic elements of a control system are shown in FIG. 1. Controllers perform the computational and/or logical functions that determine if the process output is as desired. Measurement instruments are used to monitor various aspects of a process such as flow rate, temperature, or pressure. Control elements such as valves or dampers are used to modify a physical aspect of a process such as liquid flow or air flow.

In the control system as shown in FIG. 1, a signal representing the desired process output is input into the controller from a user. A signal representing the actual process output, as measured by measurement instruments, is also input into the controller. The controller generates one or more control signal(s) and sends the control signal(s) to the control element which modifies the process so that the actual process output matches the desired process output. The control signals change with time as a result of the controller's reaction to changes in desired process output; variations in the actual process output; process irregularities which should not cause control element reaction; imperfections in system instrumentation; signal error resulting from environmental conditions; and the inability of the control element to exactly match the intended physical adjustment to the process.

The ability of a control element to create an accurate physical adjustment is limited by the characteristics of the control element. When control systems attempt to attain accuracy beyond the inherent capabilities of the control element, oscillations and system instability can result. Oscillation in a control system causes increased movement of the control element which causes excessive wear and premature failure of the control system. Oscillation, wear, and failure tend to reduce the accuracy of the process, and therefore negatively impact the actual process output.

Continuous signal variations to the control element can cause the control element to undergo physical adjustment much more often than desirable, and much more often than necessary to control the process within acceptable limits. An increased number of physical adjustments can result in excessive wear. Excessive wear in the control element reduces the accuracy and reliability of the control element and thus the accuracy and reliability of the control system.

Prior attempts to reduce the reactions of a control element to insignificant changes in the input control signals include: reducing signal transmission errors and uncontrollable process jitter by applying a filter; reducing inaccuracies of measurement instruments, control elements or other interposed equipment by using high accuracy equipment; or reducing unwanted small changes by applying a dead band to the inputs of the control element.

Signal transmission errors and jitter, often collectively called "noise", can be reduced but not eliminated through the use of filtering of control system signals. Applying signal filtering can, however, result in a delay in the control system's response, and can cause a control system to become unstable. Additionally, the remnants of noise which can exist in a control system using filtering can still result in unwanted movement of the control element.

Other attempts to reduce unnecessary control element movement have largely depended on the type of signal applied to the control element and the type of control element. Systems using pneumatic-powered control elements, based on using air pressure in conjunction with electrical control, employ different schemes for coordinating the electricity and the air pressure. Such systems typically employ mechanical friction and/or electrical techniques to create a dead band. Dead band, as used herein, refers to a range of signal values where changes of an input control signal falling within the range do not cause a response in the control system output. Dead band can be used to reduce unwanted control element movement in pneumatic systems, however, use of dead band reduces the accuracy of the control element. This reduced accuracy tends to degrade the actual process output, which can result in significant reactions in the control system, which can result in increased unwanted movements of the control element.

Systems which create dead band using friction are typically inaccurate since friction can change with age, temperature, humidity, vibration of mechanical elements, changes in the characteristics of the process or other environmental factors. Variability of the dead band reduces the predictability of the control element. If the control element is not predictable, controlling the process is extremely difficult. Typically, the dead band in systems affected by environmental factors is significantly increased during aging, resulting in the inability of the control element to respond to desired small changes in the process. This inability of the control element to respond to desired changes results in reduced process accuracy and efficiency.

In systems with electrical dead band, mechanical friction may act to hinder the electrical dead band or to enhance the electrical dead band. Systems using electric-powered control elements typically try to minimize all sources of friction, and rely solely on electrical dead band. In systems where friction has been reduced to negligible levels, system dead band is created using various electrical circuit techniques. Although the electrical circuits of such systems can have increased accuracy and reduced failure due to wear, noise can still cause system inaccuracy and the mechanical control elements of the system can still suffer from wear. The dead band of such systems can be set to allow for the inaccuracies and wear characteristics of the mechanical system elements. However, if dead band is reduced beyond the inherent accuracy of the mechanical elements, the control element can become unstable, resulting in wear and process disturbances. If the dead band is large, process accuracy and efficiency are reduced.

In systems using improved measurement equipment, control systems, and electrical communication techniques to remove noise from the control system, dead band can be reduced. However, when noise is removed from a control system, control element stability becomes a limiting factor for how small the dead band can be. For systems using a single dead band range chosen for both a particular system's demand characteristics and to prevent control element instability, the control elements are prevented from providing optimal control.

Accordingly, it is desirable to have a control device which can reduce the size of the dead band to increase accuracy, and still preserve dead band to prevent insignificant movements of a control element substantially improving the overall accuracy of the control system.

By associating different dead bands with different signal changes or categories of signal change, the dead band can be substantially optimized to match the noise and accuracy characteristics of the signals of a control system. A reduced or minimum dead band can therefore be used for each signal. This allows for a system that increases or maximizes overall accuracy and reduces or minimizes control element wear.

BRIEF SUMMARY OF THE INVENTION

An improved control device and method is provided for controlling a control element by receiving a controller demand signal and a control element sensor signal, and processing the controller demand signal and the control element sensor signal to determine if there is a change in the controller demand signal and/or a change in the control element sensor signal. A first dead band range and/or a second dead band range is determined based on the change in the controller demand signal and/or based on the change in the control element sensor signal. An error signal is calculated from the controller demand signal and the control element sensor signal. A determination is made as to whether the error signal is outside of the first dead band range and/or the second dead band range if the controller demand signal is changing and/or whether the error signal is outside of the second dead band range if the controller demand signal is not changing. A control signal for controlling the control element is generated based on the determination of the dead band ranges and whether the calculated error signal is outside of the first and/or second dead band ranges.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

A control device and method for controlling a control element is described. The control device of the present invention preferably includes a microprocessor to compare a controller demand signal, representing a desired position or state of a control element and a control element sensor signal representing the position or state of the control element. The microprocessor preferably generates a control signal as a function of the controller demand signal and the control element sensor signal for controlling the control element. Control elements as referred to herein, may include valves, dampers or any device used to change, control or modulate a process.

Figure 1:
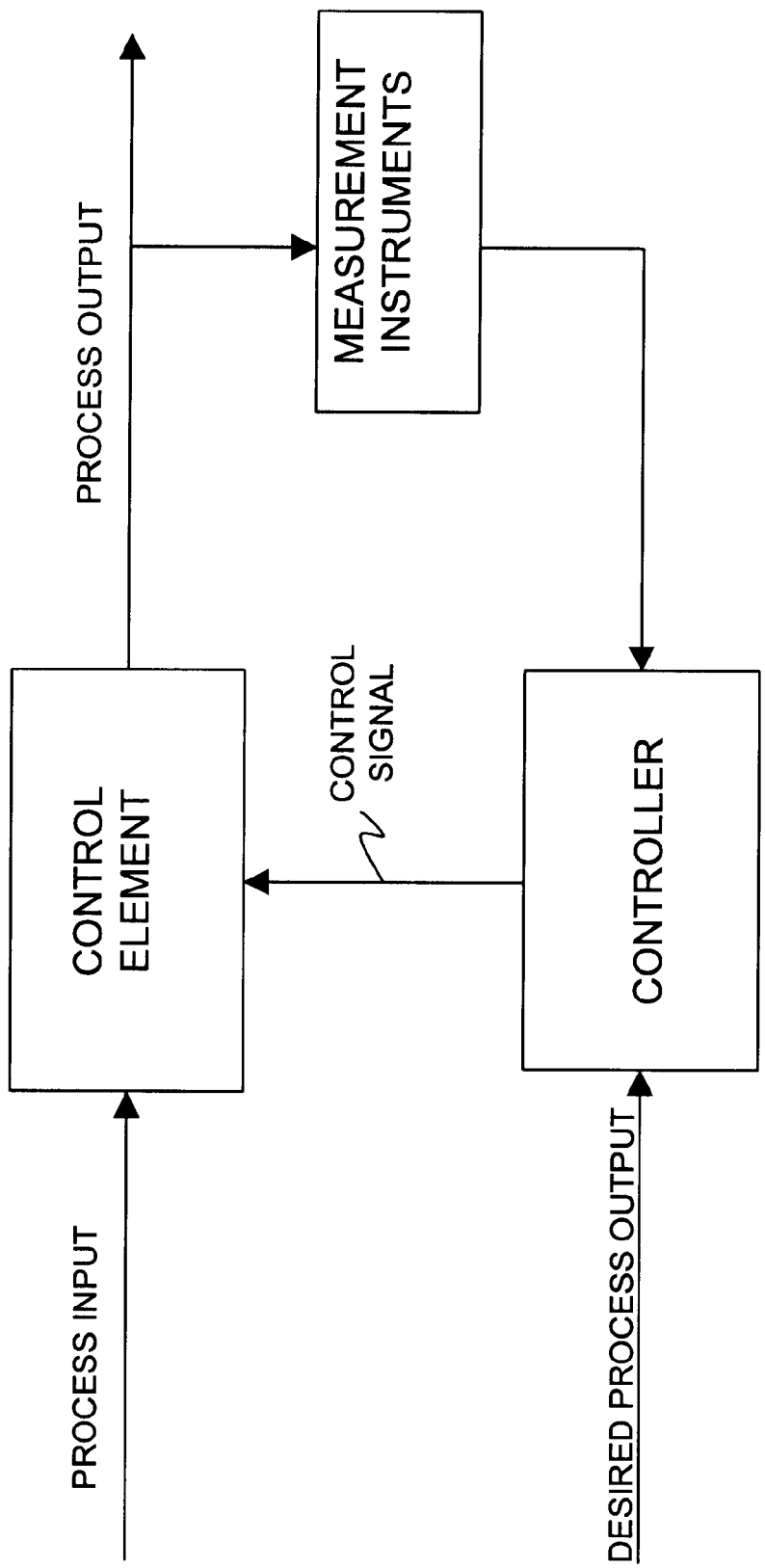
FIG. 1 is a functional schematic block diagram illustrating the basic elements of a prior art control system.
Figure 2:
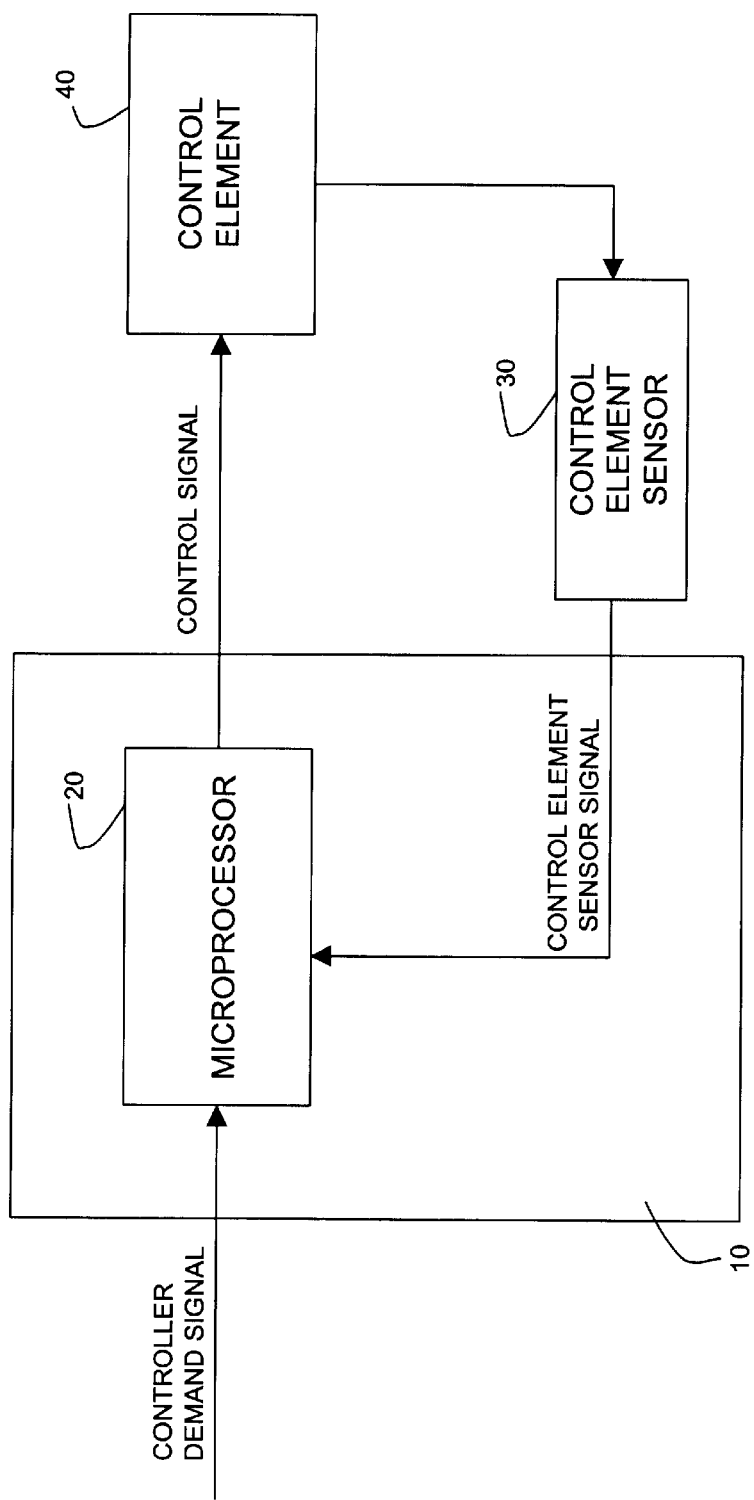
FIG. 2 is a functional schematic block diagram illustrating one preferred embodiment of a control system in accordance with the present invention.

Referring to FIG. 2, there is illustrated a functional block diagram of a control device 10 in accordance with one preferred embodiment of the present invention. As shown, the control device 10 preferably includes a microprocessor 20 as a logic device for the control device 10. Although shown to be a microprocessor, the logic device could include any other type of programmable or logic device, implemented as a microcontroller, digital signal processor, or as a collection of discrete digital logic devices. The microprocessor 20 is preferably used since it allows for greater flexibility by virtue of being programmable. The control device and method of the present invention may also be implemented using analog or digital circuitry or a combination of analog and digital circuitry.

Figure 3:
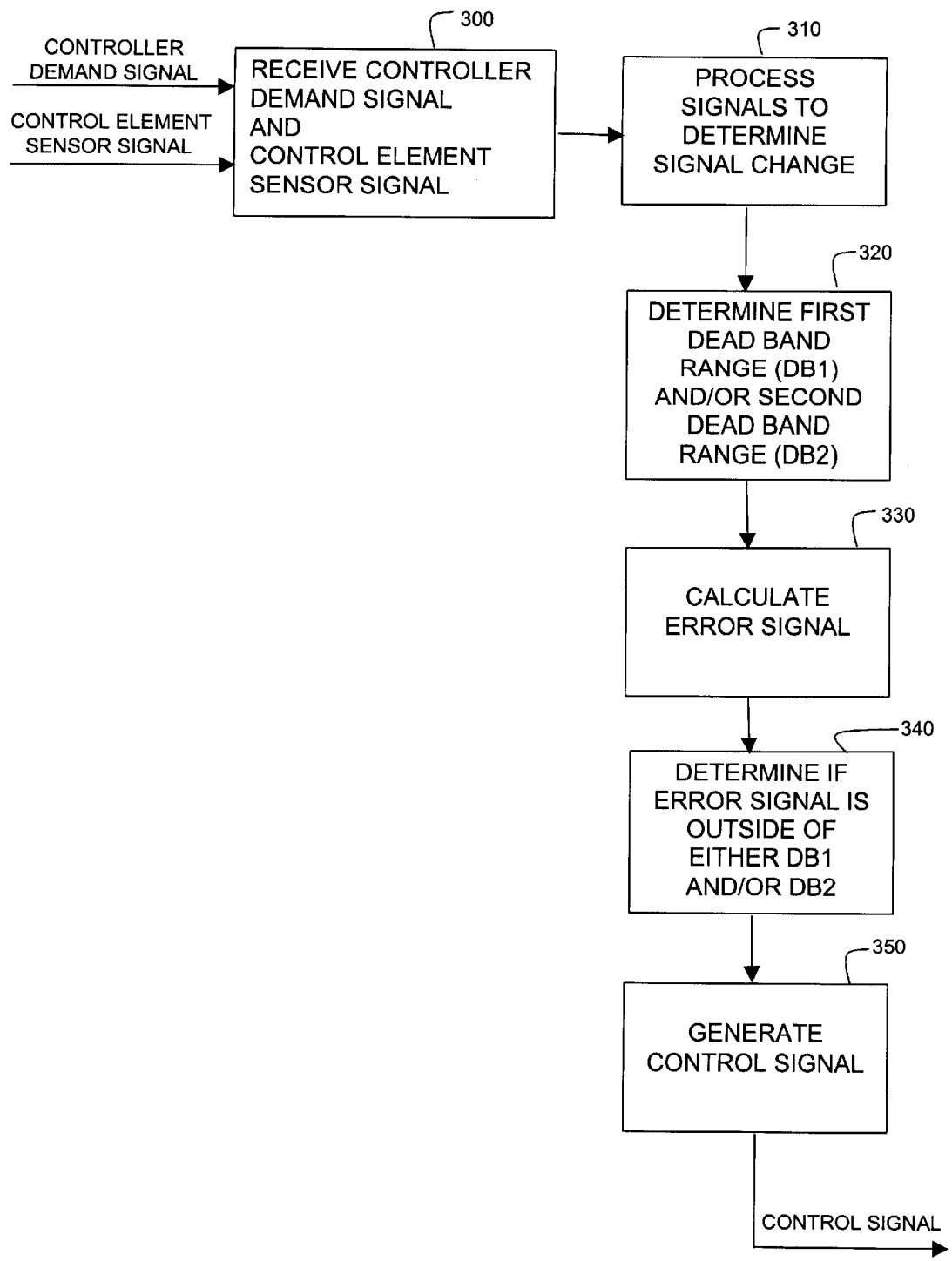
FIG. 3 is a flow diagram illustrating one preferred embodiment of a control method in accordance with the present invention.

Generally, the control device 10 reads a controller demand signal received from a system controller and a control element sensor signal received from a control element sensor 30 or similar measurement device, and generates an output control signal for controlling the control element 40. More specifically, as can be understood from FIG. 3, the control device 10 receives the controller demand signal and the control element sensor signal 300, and the microprocessor 20 processes the received signals 310 to determine if either the controller demand signal is changing and/or the control element sensor signal is changing. The existence of change is preferably established by comparing signal levels over a period of time. The microprocessor 20 determines a first dead band range (DB1) and/or a second dead band range (DB2) based on the change in the controller demand signal, and/or based on the change in the control element sensor signal 320. An error signal is calculated 330 from the controller demand signal and the control element sensor signal, and a determination is made to see if the error signal is outside of DB1 and/or DB2 when the controller demand signal is changing, and/or when the control element sensor signal is changing 340. The microprocessor 20 then generates a control signal 350 for controlling the control element 40 based upon the determination(s). Preferably, the control signal varies as a function of the calculated error signal.

In one preferred embodiment, DB1 and DB2 are each initially assigned a value from ranges of acceptable values. The ranges of acceptable values for DB1 and DB2 may be different, one being wider or narrower than the other. The ranges of acceptable values are preferably established based on the anticipated application and/or the inherent capability of the control element 40. The initial values assigned to DB1 and DB2 preferably reflect either a request from an end user of the control device 10, or an estimate of the correct value based on the end user application. In operation of the control device 10, the values for DB1 and DB2 are preferably determined based on a number of factors including but not limited to noise levels of signals received and transmitted by the control device 10, the number of movements per minute of the control element 40, other operational statistics, or set by human operator intervention, or remote computer intervention. Modifications to the ranges of acceptable values can be made, for example, to adjust for a discrepancy between the anticipated and actual application, and/or between the estimated and actual capability of the control element 40. Modifications to the ranges of acceptable values for DB1 and DB2 may be based on a number of factors including but not limited to noise levels of signals received and transmitted by the control device 10, the number of movements per minute of the control element 40, other operational statistics, or set by human operator intervention, or remote computer intervention. The ranges of acceptable values for DB1 and DB2 are preferably limited to keep DB1 and DB2 within values determined from historical data for an application. One possible example for the width of the ranges for DB1 and DB2 are from about 0.2% to about 2.0% and about 0.6% to about 2.5%, respectively.

Figure 4:
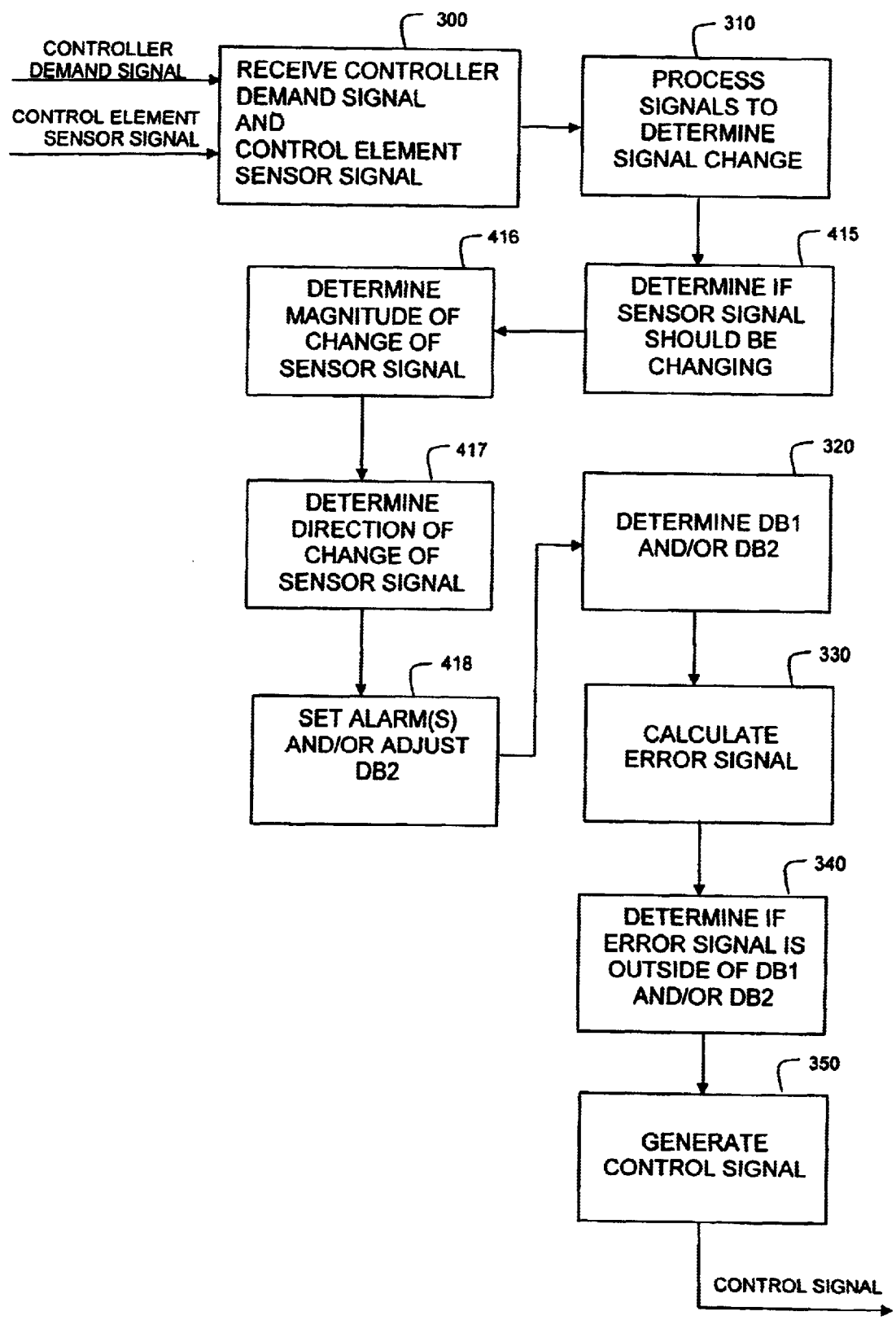
FIG. 4 is a flow diagram illustrating another preferred embodiment of a control method in accordance with the present invention.

In another preferred embodiment of the present invention illustrated in the flow diagram of FIG. 4, the method of the invention further comprises determining if the control element sensor signal should be changing 415, and determining the magnitude and direction of the change in the control element sensor signal 416, 417.

The method of the invention as illustrated in FIG. 4 may also include setting an alarm and/or adjusting the second dead band range 418 if the magnitude of the change in the control element sensor signal is greater than a predetermined value. Preferably, a first alarm is set and/or the second dead band range DB2 is adjusted according to a first method if the control element sensor signal is changing in alternate directions, and a second alarm is set and/or the second dead band range DB2 is adjusted according to a second method if the control element sensor signal is changing in one direction. Preferably the predetermined value is set as a function of the second dead band range.

Alarms may be set by activating a visual indicator on an accompanying circuit board or associated hardware. The visual indicator can be a single element or may be multiple elements each having a state which indicates an alarm condition. Alarms may also be set by generating a signal indicating an alarm at one or more elements of the control system. The signal preferably contains alarm information representing various alarm conditions such as too many sensor signal changes, or too large of a change in the sensor signal, etc. The signal containing the alarm information may be transmitted via a network, a wireless connection, or the like, to or from the control device, a data accumulation device, or other device which uses the signal to produce one or more alarm indicators.

As an example of adjusting the dead band range, for conditions of process, control element and dead band that result in less than about 10 re-positions per minute of the control element 40, the first and second dead band ranges DB1, DB2 can be systematically reduced based on the microprocessor 20 measuring the average number of re-positions per minute. For conditions of process, control element and dead band that result in more than about 10 re-positions per minute, the first and second dead band ranges DB1, DB2 can be systematically increased incrementally, preferably over an extended period of time. A maximum dead band is preferably employed to keep the dead band ranges within reasonable limits. Under conditions which result in approximately about 10 re-positions per minute, the microprocessor 20 preferably incrementally increases and decreases the first and second dead band ranges as necessary to maintain the about 10 re-positions per minute average. Alternatively, the microprocessor 20 can be designed to also maintain particular dead band ranges regardless of the resulting number of re-positions.

Figure 5:
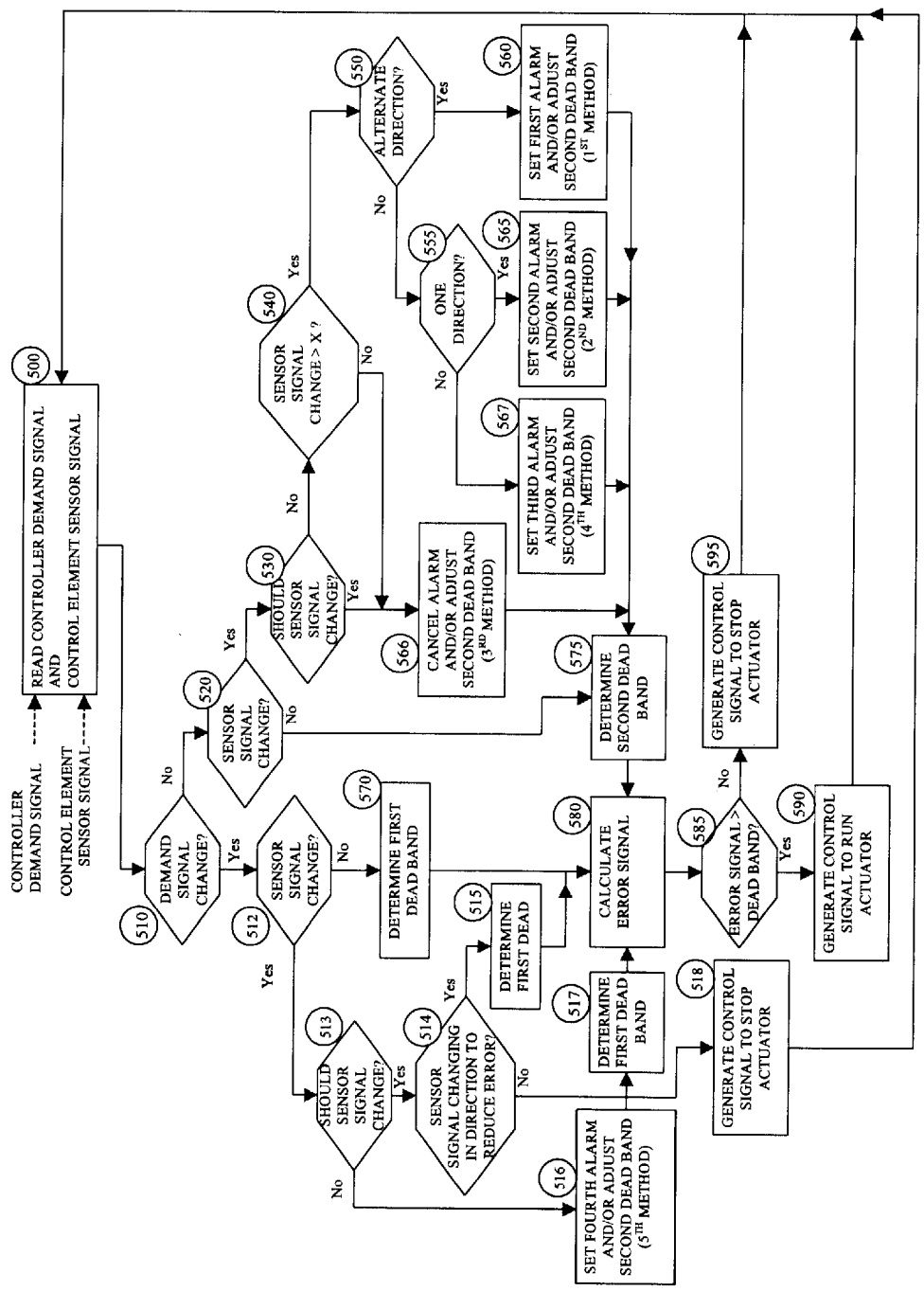
FIG. 5 is a logic flow diagram illustrating another preferred embodiment of a control method in accordance with the present invention.

In another preferred embodiment of the present invention illustrated in the logic flow diagram of FIG. 5, the method of the invention comprises reading the controller demand signal and the control element sensor signal 500; testing the controller demand signal to determine if the signal is changing 510; testing the control element sensor signal to determine if the signal is changing 520; determining if the control element sensor signal should be changing 530; determining if the control element sensor signal is changing by an amount greater than a predetermined amount 540; and determining if the control element sensor signal is changing in alternate directions 550 or one direction 555.

If the controller demand signal is changing 510, and the control element sensor signal is not changing 512, the first dead band range DB1 is determined 570 based on the change in the controller demand signal. If the controller demand signal is changing 510, the control element sensor signal is changing 512, and the control element sensor signal should be changing 513, and is not changing in a direction to reduce the error 514, the actuator control signal is generated to stop the actuator 518. If the controller demand signal is changing 510, the control element sensor signal is changing 512, and the control element sensor signal should be changing 513, and is changing in a direction to reduce error 514, the first dead band range DB1 is determined 515. If the controller demand signal is changing 510, the control element sensor signal is changing 512, and the control element sensor signal should not be changing 513, an alarm is set and the second dead band range DB2 is adjusted according to a fifth method 516, and the first dead band range is determined 517.

If the controller demand signal is not changing 510 and the control element sensor signal is not changing 520, the second dead band range DB2 is determined 575. If the controller demand signal is not changing 510, the control element sensor signal is changing 520 and should be changing 530, any alarm is cancelled and/or the second dead band range DB2 is adjusted according to a third method 566 and the second dead band range DB2 is determined 575.

If the controller demand signal is not changing 510, the control element sensor signal is changing 520 and should not be changing 530, and the control element sensor signal is not changing by an amount greater than a predetermined amount 540, any alarm is cancelled and/or the second dead band range DB2 is adjusted according to a third method 566 and the second dead band range DB2 is determined 575.

If the controller demand signal is not changing 510, the control element sensor signal is changing and should not be changing 530, the control element sensor signal is changing by an amount greater than a predetermined amount 540, and the control element sensor signal is changing in alternate directions 550, a first alarm is set and/or the second dead band range DB2 is adjusted according to a first method 560 and the second dead band range DB2 is determined 575.

If the controller demand signal is not changing 510, the control element sensor signal is changing 520 and should not be changing 530, the control element sensor signal is changing by an amount greater than a predetermined amount 540, and the control element sensor signal is not changing in alternate directions 550 and is changing in one direction 555, a second alarm is set and/or the second dead band range DB2 is adjusted according to a second method 565 and the second dead band range DB2 is determined 575.

If the controller demand signal is not changing 510, the control element sensor signal is changing 520 and should not be changing 530, the control element sensor signal is changing by an amount greater than a predetermined amount 540, and the control element sensor signal is not changing in alternate directions 550 or in one direction 555, a third alarm is set and/or the second dead band range DB2 is adjusted according to a fourth method 567 and the second dead band range DB2 is determined 575.

DB2 is preferably adjusted according to the first method, discussed above, to compensate for alternating change in the control element sensor signal by increasing DB2 incrementally to reduce the change in the control signal. Increasing DB2 is preferably done in a symmetrical manner (e.g. where 0% represents the mid-point of DB2, the dead band would be increased equally on each side of the 0% error.)

DB2 is preferably adjusted according to the second method to compensate for change in the control element sensor signal in one direction by increasing DB2 incrementally to reduce the change in the control signal. Increasing DB2 is preferably done in an asymmetrical manner (e.g. where 0% represents the mid-point of DB2, the dead band would be increased on only one side of the 0% error in the direction of change of the sensor signal.)

DB2 is preferably adjusted according to the third method to take advantage of a well performing control system by reducing DB2 incrementally to reduce the dead band range and make DB2 symmetrical around a 0% error.

DB2 is preferably adjusted according to the fourth method to compensate for unwanted change in the control element sensor signal that could not be identified as alternating or unidirectional by increasing DB2 incrementally to reduce the change in the sensor signal. Adjusting DB2 according to the fourth method can be performed in a plurality of stages by first increasing the dead band on one side of the 0% error, and, if the first increase did not reduce the change in the control element sensor signal, the dead band is increased on the other side of the 0% error, increasing the total dead band and making DB2 symmetrical around 0% error.

DB2 is preferably adjusted according to the fifth method to compensate for unwanted change in the control element sensor signal while the demand is changing or has changed. If the unwanted control element sensor signal change is in a direction which reduces error in the control system (i.e. the control element sensor signal is changing in the same direction as the demand signal, resulting in a desirable situation), DB2 is preferably held constant. If the unwanted control element sensor signal change is in a direction which increases error, DB2 is preferably increased or decreased incrementally to optimize the error tolerated in the control element sensor signal.

Once the first and/or second dead band ranges DB1, DB2 are determined 570, 515, 575, an error signal is calculated 580, and the first and/or second dead band ranges DB1, DB2 are applied 585 to generate the control signal 590, 595. In one preferred embodiment of the invention the first and/or second dead band ranges DB1, DB2 are applied to generate the control signal in the following manner:

If the controller demand signal is changing, the error signal is compared to DB1 and DB2 and;
a) if the error signal is greater than DB1 or DB2, the control signal is generated to control the control element to reduce the error;
b) if the error signal is less than DB1 and DB2, the control signal is generated to control the control element to maintain the current status of the control element (e.g. position).

If the controller demand signal is not changing, the error signal is compared to DB2 and;
a) if the error signal is greater than DB2, the control signal is generated to control the control element to reduce the error;
a) if the error signal is less than DB2, the control signal is generated to control the control element to maintain the current status.

Figure 6:
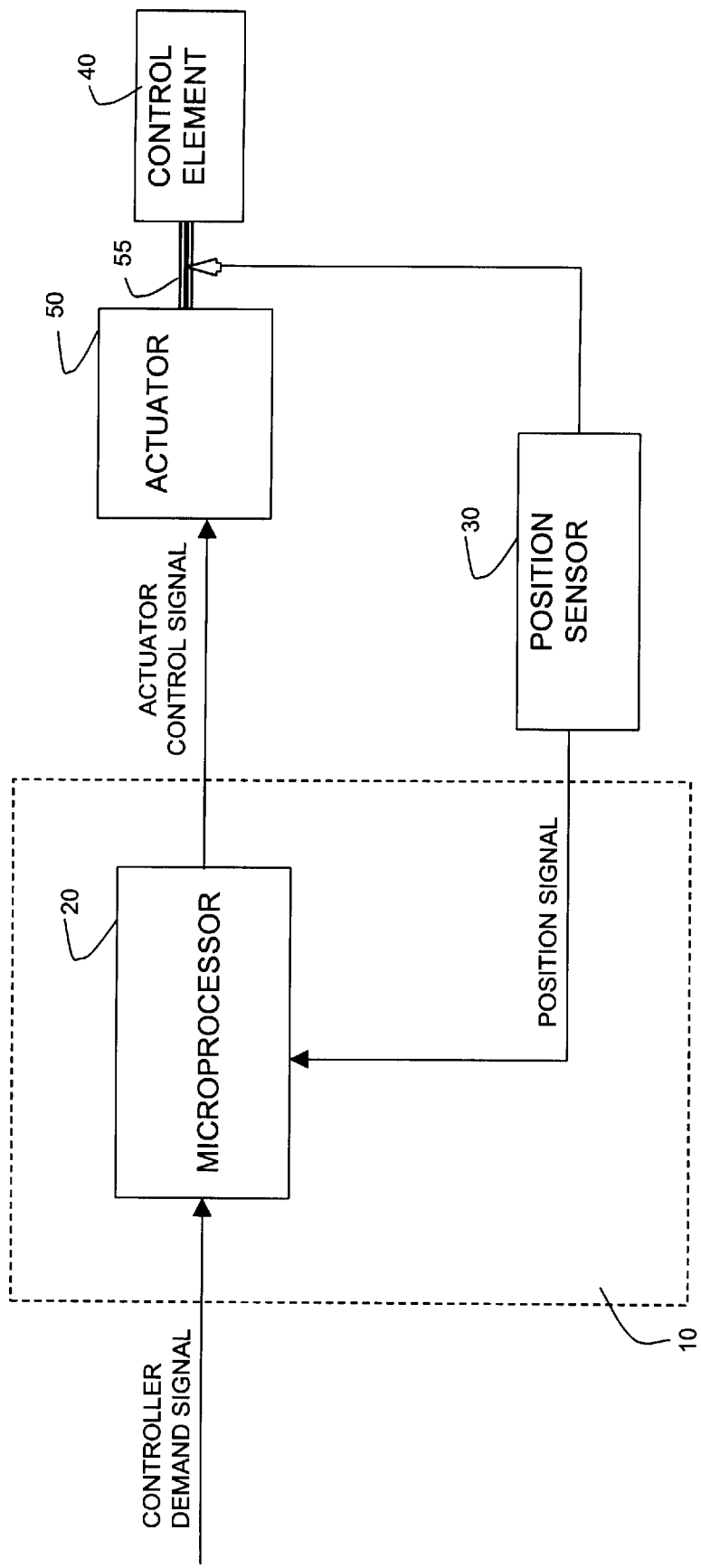
FIG. 6 is a functional schematic block diagram illustrating another preferred embodiment of a control system in accordance with the present invention.

In one application of the preferred control device and method of the present invention, illustrated in FIG. 6, the control signal is generated as an actuator control signal which controls an actuator 50 coupled to the control element 40 by, for example, an actuator shaft 55. As can be understood from FIG. 6, the control element sensor is a position sensor 30 which is used to sense the position of the actuator shaft 55, and generate a position signal. The actuator control signal is preferably generated to turn on an actuator motor (not shown) of the actuator 50 if the error signal calculated by the microprocessor 20 is outside of the first and/or second dead band ranges DB1, DB2. The actuator control signal is preferably generated to stop the actuator motor if the error signal calculated by the microprocessor 20 is not outside of the first and/or second dead band ranges DB1, DB2.

Figure 7:
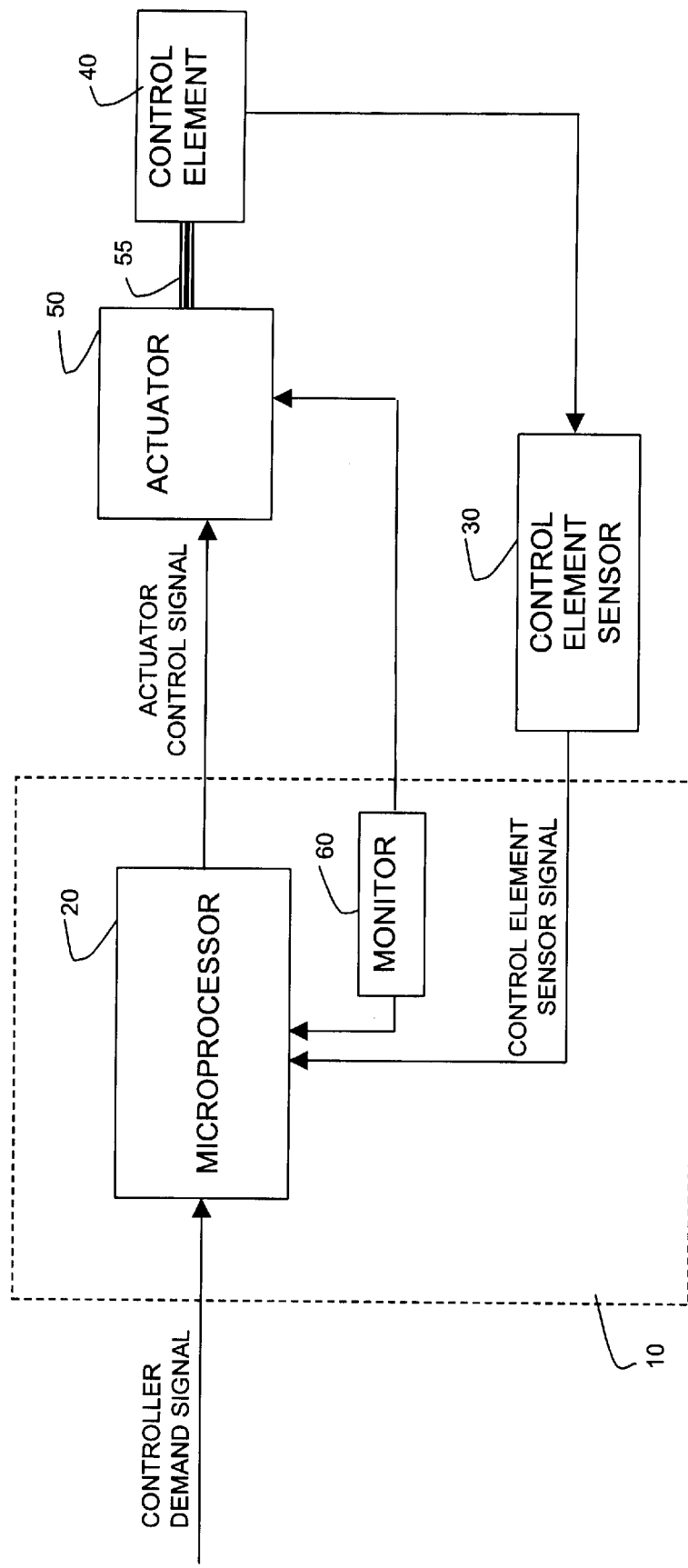
FIG. 7 is a functional schematic block diagram illustrating another preferred embodiment of a control system in accordance with the present invention.

In another preferred embodiment illustrated in FIG. 7, the control device 10 of the invention incorporates a monitor 60 for monitoring the magnitude of current being supplied to the actuator motor (not shown). Monitoring the current to the actuator motor provides information about the condition of the control device which can be used to determine the ability of the actuator 50 to maintain a correct control element 40 position. By monitoring the current to the actuator motor, the control device 10 can determine if power is being supplied to the actuator motor erroneously. If power is being supplied to the actuator motor contrary to the control of the control device 10, the control device 10 is not in control of the process. This situation would justify an alarm. Additionally, by monitoring the current to the actuator motor, the control device 10 can distinguish between an error in the control device 10 causing the actuator output to change, and a mechanical condition which causes the actuator output to change.

As can be understood from the above discussion, dead band is used with the control device 10 and method of the present invention to reduce or minimize unwanted changes in the control signal and accordingly in the control element 40. Unwanted changes can include changes due to electrical noise or changes in mechanical load on the control element 40. Preferably, separate dead band ranges are calculated for changes in the controller demand signal (i.e. changes in the desired position or state of the control element 40) and for changes in the control element sensor signal (e.g. changes in the actual position of the control element 40). By separating the dead band into two separate functions: the dead band relative to the control system and the dead band relative to the control element 40, the accuracy of the control system is improved and system performance can be substantially optimized.

Application of the control device and method of the invention allow for the effective use of a small dead band for movements initiated by the controller demand signal. In systems incorporating an actuator 50, use of a small dead band allows the actuator 50 to closely follow the controller demand signal. Alternatively, a larger dead band can be used for changes in the control element sensor signal. Use of a larger dead band prevents the actuator 50 from becoming unstable.

Causes of changes in the control element sensor signal other than those initiated by the controller demand signal may include a change in pressure drop across a control element 40 such as a valve, or reversal of pressure in the control element 40, interactions between friction and weight, or the like.

The values of the first and second dead band ranges DB1, DB2 may be factory set, chosen or changed locally by the user, chosen or changed remotely using, for example, a modem and a communications protocol, or set automatically (e.g. while on line, the amount of mechanical backlash on a control element can be measured and the values of the dead band ranges can be automatically set by a microprocessor).

The control device 10 of the invention may also include a self locking mechanism for maintaining the actuator position when the motor is de-energized.

In applying the control device and method to a control system having an actuator 50, the values of the actuator control signal for different error signal values may be factory set, chosen or changed locally by the user, chosen or changed remotely using, for example, a modem and a communications protocol, or set automatically. The actuator control signal can also be set to vary as a function of the error signal to provide variable or multi-speed control of the actuator motor.

The microprocessor 20 may also be used to measure the amount of noise superimposed on the controller demand signal or the control element sensor signal, determine if either signal possesses excessive noise, generate a signal indicating the excessive noise condition, filter out the noise and/or adjust the dead band ranges DB1, DB2 applied for changes in the controller demand signal or the control element sensor signal, and compare noise values from different time periods for diagnostic purposes. Adjustments to the dead band ranges DB1, DB2 may include increasing or decreasing the dead band if the amount of noise is high or low, respectively. The microprocessor 20 may also be designed to determine a noise level based on the number of repositions of the control element per minute.

The microprocessor 20 can also be used to measure the amount of mechanical backlash of the actuator mechanism, generate a signal indicating the backlash condition and compare backlash values from different time periods for diagnostic purposes to determine wear of gearing and/or a self-locking mechanism. For example, by monitoring changes in the control element sensor signal when no change in the controller demand signal exists, it can be determined if a self-locking mechanism is worn or slipping.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for controlling a control element comprising:
   (a) receiving a controller demand signal and a control element sensor signal;
   (b) processing the controller demand signal and the control element sensor signal to determine change in the controller demand signal and/or change in the control element sensor signal;
   (c) determining a first dead band range and/or a second dead band range based on the change in the controller demand signal and/or based on the change in the control element sensor signal;
   (d) calculating an error signal from the controller demand signal and the control element sensor signal;
   (e) determining if the error signal is outside of the first dead band range and/or the second dead band range if the controller demand signal is changing, and/or determining if the error signal is outside of the second dead band range if the controller demand signal is not changing; and
   (f) generating a control signal for controlling the control element based on the determinations of steps (c) and (e).

2. The method of claim 1 wherein determining the first dead band range in step (c) is further based on the accuracy requirements of the control device, and determining the second dead band range is further based on the mechanical stability of the control element.

3. The method of claim 1 wherein determining the second dead band range of step (c) further comprises:
   determining if the control element sensor signal should be changing;
   determining the magnitude and direction of the change in the control element sensor signal; and
   setting an alarm and/or adjusting the second dead band range.

4. The method of claim 3 further comprising:
   setting a first alarm and/or adjusting the second dead band range according to a first method if the control element sensor signal should not be changing, has changed more than a predetermined value and is changing in alternate directions;
   setting a second alarm and/or adjusting the second dead band range according to a second method if the control element sensor signal should not be changing, has changed more than a predetermined value is not changing in alternate directions, and is changing in one direction;
   setting a third alarm and/or adjusting the second dead band range according to a fourth method if the control element sensor signal should not be changing, has changed more than a predetermined value, is not changing in alternate directions, and is not changing in one direction; and
   canceling any alarm and/or adjusting the second dead band range according to a third method if the control element sensor signal should be changing, or should not be changing but has not changed more than a predetermined value.

5. The method of claim 1 wherein determining the first dead band range of step (c) comprises:
   determining if the control element sensor signal should be changing, and setting a fourth alarm and/or adjusting the second dead band range according to a fifth method if the control element sensor signal should not be changing.

6. The method of claim 1 wherein determining the first dead band range of step (c) comprises:
   determining if the control element sensor signal should be changing;
   if the control element sensor signal should be changing, determining if the control element sensor signal is changing in a direction to reduce error; and
   generating a control signal for controlling the control element if the control element sensor signal is not changing in a direction to reduce error.

7. The method of claim 1 wherein step (f) further comprises varying the control signal as a function of the error signal calculated in step (d).

8. The method of claim 1 wherein the control signal is an actuator control signal which controls an actuator coupled to the control element.

9. The method of claim 8 wherein the actuator control signal is generated to run an actuator motor if the error signal calculated in step (d) is outside of the first or second dead band ranges, and is generated to stop an actuator motor if the error signal calculated in step (d) is not outside of the first or second dead band ranges.

10. A control device for controlling a control element comprising:
    a processor for receiving a controller demand signal and a control element sensor signal, and for generating a control signal for controlling the control element;
    wherein the processor receives the controller demand signal and the control element sensor signal, processes the controller demand signal and the control element sensor signal to determine variation of the controller demand signal and/or variation of the control element sensor signal, determines a first dead band range and/or a second dead band range based on the variation of the controller demand and/or variation of the control element sensor signal, calculates an error signal from the controller demand signal and the control element sensor signal, determines if the error signal is outside the first and/or second dead band ranges, and generates the control signal for controlling the control element.

11. The control device of claim 10 wherein the control signal varies as a function of the error signal.

12. The control device of claim 10 wherein the processor measures the amount of noise superimposed on the controller demand signal and/or on the control element sensor signal and determines if either signal possesses excessive noise.

13. The control device of claim 12 wherein the processor generates a signal indicating the excessive noise condition.

14. The control device of claim 12 wherein the processor filters out the noise and/or adjusts the first and/or second dead band ranges.

15. The control device of claim 12 wherein the processor compares noise values from different time periods for diagnostic purposes.

16. The control device of claim 10 wherein the processor measures the amount of mechanical backlash of the control element, and generates a signal indicating the backlash condition.

17. The control device of claim 16 wherein the processor compares backlash values from different time periods for diagnostic purposes to determine wear of control element gearing and/or of a control system self-locking mechanism.

18. A control device for controlling a control element comprising:
    (a) means for receiving a controller demand signal and a control element sensor signal;
    (b) means for processing the controller demand signal and the control element sensor signal to determine change in the controller demand signal and/or change in the control element sensor signal;
    (c) means for determining a first dead band range and/or a second dead band range based on the change in the controller demand signal and/or based on the change in the control element sensor signal;
    (d) means for calculating an error signal from the controller demand signal and the control element sensor signal;
    (e) means for determining if the error signal is outside of the first dead band range and/or the second dead band range if the controller demand signal is changing, and/or determining if the error signal is outside of the second dead band range if the controller demand signal is not changing; and
    (f) means for generating a control signal for controlling the control element based on the determination of the first and second dead band ranges and if the error signal is outside the first and/or second dead band ranges.

19. The control device of claim 18 wherein the means for determining the first and second dead band ranges determines the first dead band range additionally based on the accuracy requirements of the control system, and determines the second dead band range additionally based on the mechanical stability of the control element.

20. The control device of claim 18 wherein the means for determining the second dead band range further comprises a means for determining if the control element sensor signal should be changing, a means for determining the magnitude and direction of the change in the control element sensor signal, and a means for setting an alarm and/or adjusting the second dead band range.

21. The control device of claim 20 further comprising:
- a means for setting a first alarm and/or adjusting the second dead band range according to a first method if the control element sensor signal should not be changing, has changed more than a predetermined value and is changing in alternate directions;
- a means for setting a second alarm and/or adjusting the second dead band range according to a second method if the control element sensor signal should not be changing, has changed more than a predetermined value is not changing in alternate directions, and is changing in one direction;
- a means for setting a third alarm and/or adjusting the second dead band range according to a fourth method if the control element sensor signal should not be changing, has changed more than a predetermined value, is not changing in alternate directions, and is not changing in one direction; and
- a means for canceling any alarm and/or adjusting the second dead band range according to a third method if the control element sensor signal should be changing, or should not be changing but has not changed more than a predetermined value.

22. The control device of claim 18 wherein the means for determining the first dead band range comprises:
- a means for determining if the control element sensor signal should be changing, and
- a means for setting a fourth alarm and/or adjusting the second dead band range according to a fifth method if the control element sensor signal should not be changing.

23. The control device of claim 18 wherein the means for determining the first dead band range comprises:
- a means for determining if the control element sensor signal should be changing; and if the control element sensor signal should be changing, determining if the control element sensor signal is changing in a direction to reduce error.

24. The control device of claim 18 wherein the means for generating a control signal further comprises means for varying the control signal as a function of the error signal.

25. The control device of claim 18 wherein the control signal is an actuator control signal which controls an actuator coupled to the control element.

26. The control device of claim 25 wherein the means for generating a control signal generates the actuator control signal to run an actuator motor if the error signal is outside of the first or second dead band ranges, and generates the actuator control signal to stop an actuator motor if the error signal is not outside of the first or second dead band ranges.

* * * * *